(12) United States Patent
Wu et al.

(10) Patent No.: US 7,872,954 B2
(45) Date of Patent: Jan. 18, 2011

(54) METHOD AND APPARATUS FOR WRITING DATA TO AN OPTICAL DISC

(75) Inventors: Xinyan Wu, Eastleigh (CN); John A. Harold-Barry, Southampton (GB)

(73) Assignee: NXP B.V., Eindhoven (NL)

( * ) Notice: Subject to any disclaimer, the term of this patent is extended or adjusted under 35 U.S.C. 154(b) by 791 days.

(21) Appl. No.: 11/629,770

(22) PCT Filed: Jun. 6, 2005

(86) PCT No.: PCT/IB2005/051833
§ 371 (c)(1),
(2), (4) Date: Dec. 15, 2006

(87) PCT Pub. No.: WO2005/124743
PCT Pub. Date: Dec. 29, 2005

(65) Prior Publication Data
US 2007/0140093 A1    Jun. 21, 2007

(30) Foreign Application Priority Data
Jun. 16, 2004    (GB)    ................................. 0413396.3

(51) Int. Cl.
*G11B 5/09*    (2006.01)
(52) U.S. Cl. .................. 369/47.17; 369/53.33
(58) Field of Classification Search ............ 369/47.17,
369/47.22, 47.26, 47.27, 53.33, 59.11
See application file for complete search history.

(56) References Cited
U.S. PATENT DOCUMENTS
5,631,892 A     5/1997   Bakx
7,304,923 B2 * 12/2007   Sano et al. ................ 369/47.17
7,440,367 B2 * 10/2008   Jung et al. ................ 369/47.27
7,496,010 B2 *  2/2009   Ohta et al. ................ 369/47.27
2002/0036967 A1  3/2002  Osada
2002/0114249 A1  8/2002  Kato et al.
2003/0123350 A1  7/2003  Kim
2003/0198174 A1 10/2003  Kondo
2004/0017755 A1* 1/2004   Kato ........................ 369/59.11
2004/0037189 A1  2/2004  Sasaki et al.
2004/0071057 A1  4/2004  Ohta et al.
2004/0218490 A1* 11/2004  Kim et al. ................. 369/47.21
2005/0041563 A1*  2/2005  Tawaragi et al. ......... 369/124.01
2005/0078572 A1*  4/2005  Shibata et al. ........... 369/44.26
2005/0157617 A1*  7/2005  Woun ...................... 369/47.27

FOREIGN PATENT DOCUMENTS
EP    1 118 981 A2    7/2001
EP    1 225 570        7/2002
JP    2002-260237 A    9/2002
JP    2002-312944 A   10/2002

* cited by examiner

*Primary Examiner*—Wayne R Young
*Assistant Examiner*—Brenda Bernardi

(57) ABSTRACT

The invention provides for a method and apparatus for writing data to an optical disc and comprising recovering an output signal from optical reading head, scaling the said output signal responsive to secondary data derived from the disc by way of the optical reading head and deriving a Land Pre Pits (LPP) signal for use during recording to the disc from the said scaled output signal wherein the said scaling is arranged to increase the LPP signal when the LPP is identified as located adjacent a mark on the disc of low light reflectivity.

8 Claims, 3 Drawing Sheets

METHOD AND APPARATUS FOR WRITING DATA TO AN OPTICAL DISC

The present invention relates to a method and apparatus for writing data to an optical disc.

Optical discs, such as DVD-R and DVD-RW discs to which information can be written, and optionally re-written as required, are becoming increasingly common as the primary medium for storing digital data.

Such discs generally include a microscopic spiral groove arranged to provide a feedback signal to the optical writing unit of an optical disc drive so as to achieve accurate tracking during the writing of data to, at the reading of data from, the optical disc.

Such a groove is generally formed by adjacent spiral lands and grooves. Embossed microstructures in the form of Land Pre-Pits are commonly provided within the lands of an optical disc and which are generally employed to provide disc-addressing information and related auxiliary data.

In current DVD-R and DVD-RW recording systems, the signal produced when the optical head encounters the Land Pre Pits (LPP), i.e. the so-called LPP signal, is employed during playback of the disc.

It is known that the LPP signal is not generally employed during the writing of data to the disc. However, it has been identified that potential advantages such as the verification and disc address, and fine-tuning of the write clock, can be achieved if the LPP signal is employed during the writing of data to the disc. In this manner, the quality with which data can be written to the disc is advantageously increased.

However, in view of the large differences in laser power employed within the optical head when writing to the disc so as to achieve the required marks and spaces, it has been found that the LPP signal cannot readily be detected during such writing to the disc particularly when the LPP is located adjacent long spaces having low light reflectivity characteristics.

Further, it is considered that known signal processing methods would not be appropriate for enhancing the detection of the LPP signal since the bandwidth of the LPP signal is closely similar to the bandwidth of larger writing signal pulses.

The present invention seeks to provide for a method and apparatus for writing data to an optical disc and having advantages over known such methods and apparatus.

According to a first aspect of the present invention there is provided a method of writing data to an optical disc and comprising the steps of:

obtaining an output signal from optical reading head;

scaling the said output signal responsive to secondary data derived from the disc by way of the optical reading head;

deriving a LPP signal for use during recording to the disc from the said scaled output signal wherein the said scaling is arranged to increase the LPP signal when the LPP is identified as located adjacent a space on the disc of low light reflectivity.

Recording performance can advantageously be increased by way of the invention through advantageous use of the LPP signal generated during writing to the optical disc.

Advantageously, the secondary data can comprise Eight to Fourteen Modulation (EFM) data or data derived from the peaks of a high frequency (HF) crosstalk signal derived from the disc.

In one particular embodiment, the said output signal comprises a push-pull signal, which can further comprise a balanced push-pull signal.

The balanced push-pull signal can be determined from the difference between a low pass filtered push-pull signal and a low pass filtered HF crosstalk signal.

Advantageously, the scaling factor employed is arranged to comprise a constant value when a small HF crosstalk signal occurs.

According to another aspect of the present invention there is provided an apparatus for writing data to an optical disc comprising:

means for obtaining an output signal from an optical reading head;

means for scaling the said output signal responsive to secondary data obtained from said optical disc and by way of the output head;

means for deriving a LPP signal for use during recording from the said scaled output signal, wherein the said scaling is arranged to increase the LPP signal when the LPP is located as being adjacent a space on the disc of low light reflectivity.

The apparatus can further be arranged with appropriate means for providing the advantages discussed above in relation to the method of the present invention.

The invention is described further hereinafter, by way of example only, with reference to the accompanying drawings in which.

Figure 4:
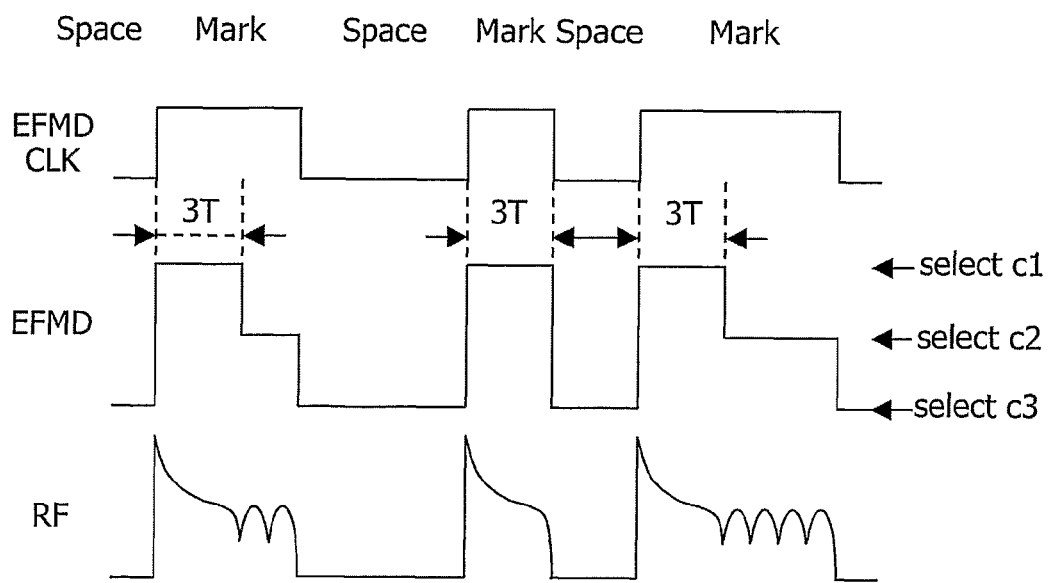
Figures 5A, 5B:
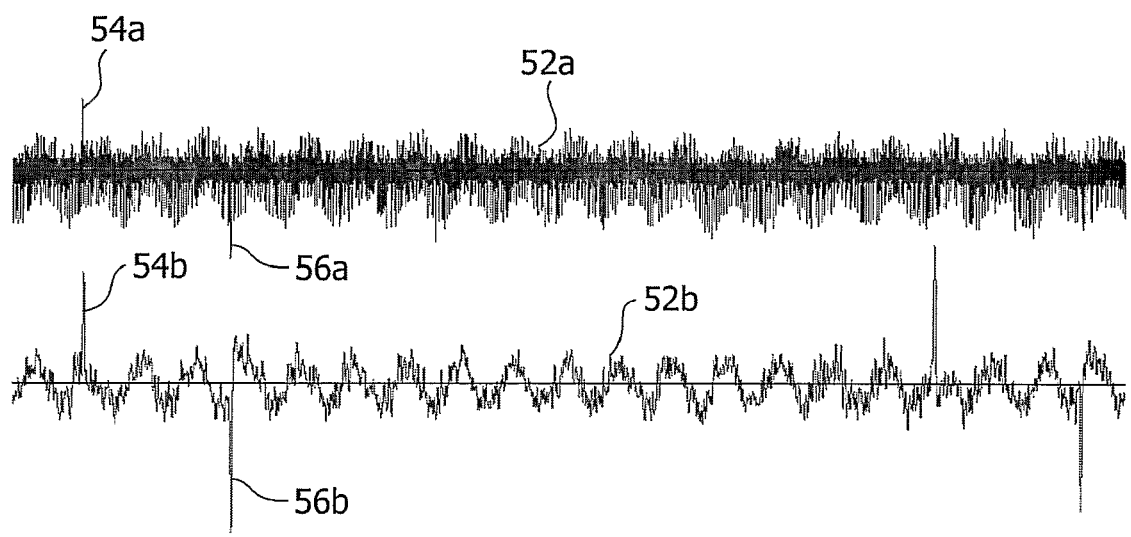

FIG. 4 comprise timing diagrams illustrating the selection of constants employed for the required scaling within the present invention; and FIGS. 5A and 5B comprise comparative traces of a LPP signal according to the prior-art and the present invention.

Figure 1:
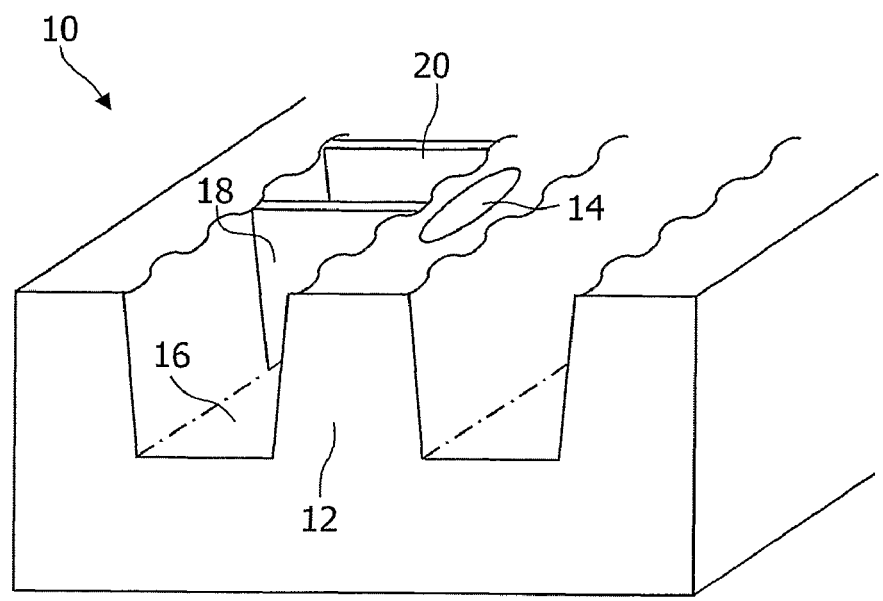
FIG. 1 is a partial perspective view of a section through an optical disc arranged to produce signals for processing in accordance with the present invention.

Turning now to FIG. 1, there is illustrated a section through part of an optical disc 10 to which data can be written and which comprises a spiral of grooves 12 upon which data marks 14 are written by means of an optical read/write head (not shown). The grooves 12 are separated by spiral lands 16. As can be seen, the upper edges of the lands 16 are formed with a sinusoidal configuration which is arranged to provide for a so-called wobble signal which is detected by the optical read/write head. This wobble signal is employed to assist with the accurate tracking of the optical read/write head as is well known in the art and so is not described any further here.

Figure 2:
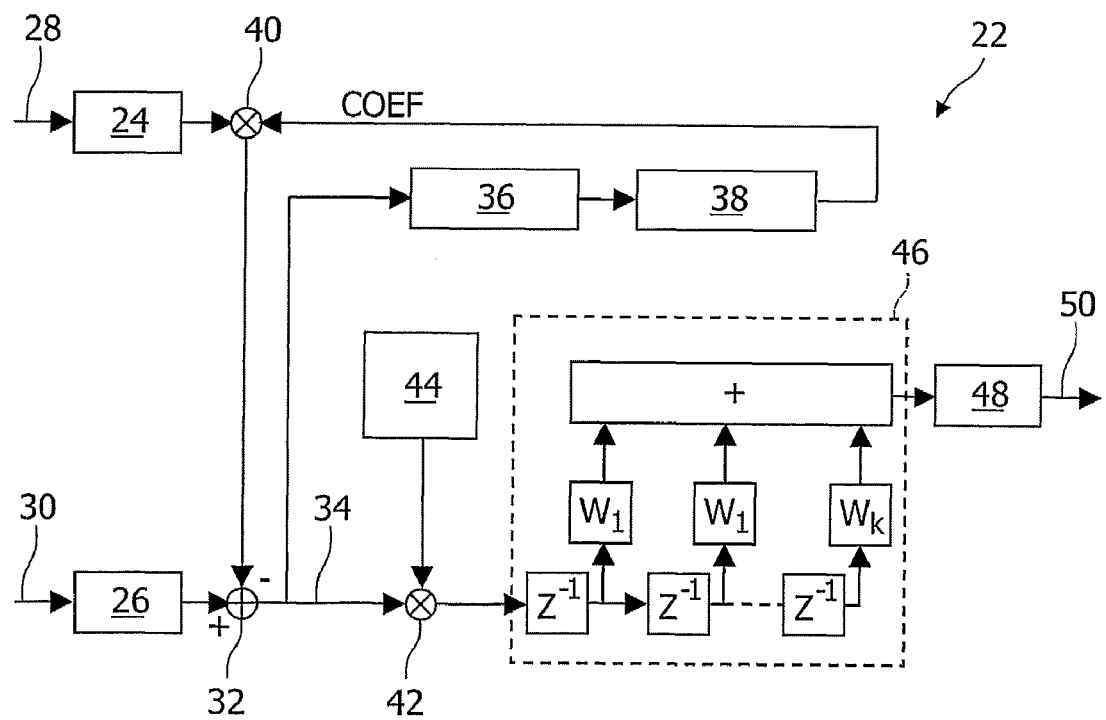
FIG. 2 is a schematic block diagram illustrating an arrangement in accordance with one embodiment of the present invention.

Turning now to FIG. 2, there is illustrated an arrangement 22 forming part of apparatus for writing data to an optical disc.

Within the arrangement, there is provided a pair of low pass filters, 24, 26 arranged for receiving a high frequency crosstalk signal 28 and push-pull signal 30 respectively from analogue-digital converters associated with an optical read/write head (not shown).

The signal output from the low pass filtered push-pull signal 30 is delivered to a difference unit 32 from which is derived a balanced push-pull signal 34.

The balanced push-pull signal 34 is delivered to an integrator and dump unit 36 the output of which is in turn delivered to a PI controller 38. The units 36, 38 are arranged to provide a coefficient (COEF), which is combined, by way of multiplier 40 with the low pass filtered high frequency crosstalk signal 28.

The output from the multiplier 40 is then delivered to the difference unit 32 and, in combination with the low pass filtered push-pull signal 30, serves to produce the aforementioned balanced push-pull signal 34.

As illustrated, the balanced push-pull signal 34 is also delivered to a multiplier 42 at which it is scaled by means of an output from a scaling unit 44.

The scaled output is then delivered to a convolution arrangement 46 arranged to provide for convolution of the scaled balanced push-pull signal 34 with a LPP-like wavelet W.

The result of this convolution within the unit 46 is delivered to a band pass filter 148 from which the final LPP signal 50 is derived.

Within the illustrated embodiment of FIG. 2, the scaling unit 44 is arranged to provide one of a plurality of constants which can be determined by n levels of a generated EFMD signal from the EMF data clock. Alternatively the constants can be derived from the amplitude levels of the HF crosstalk signal through detection of the peak and bottom levels of such signal where the number of levels "n" can be determined to calculate the standard deviation of the LPP signal in a digital signal processor, or similar digital hardware.

Figure 3:
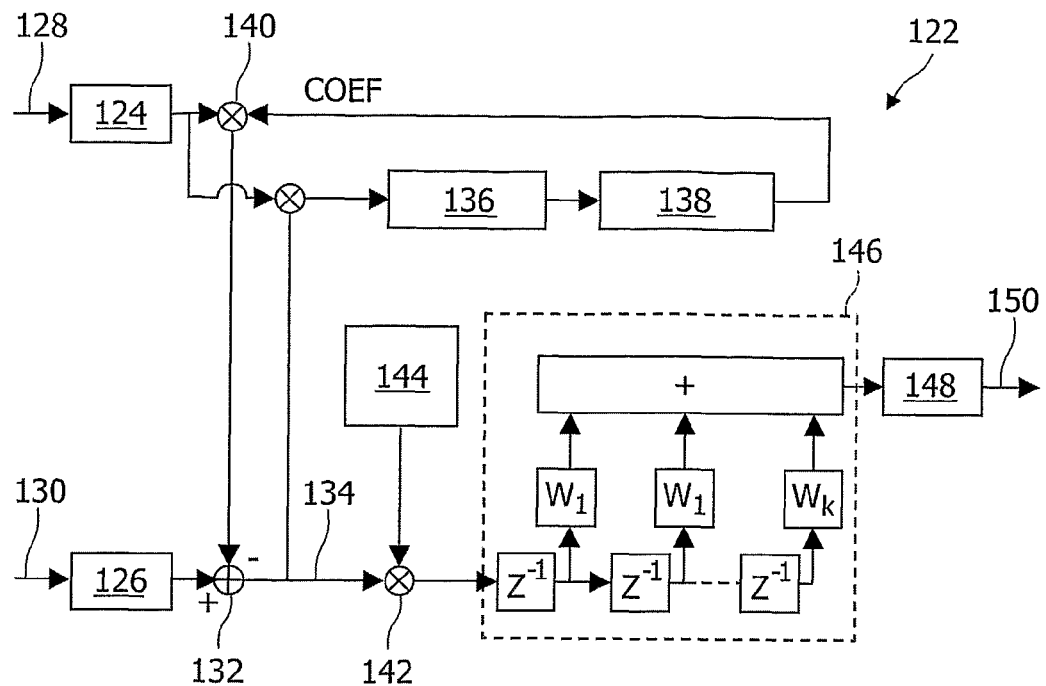
FIG. 3 is a schematic block diagram of an arrangement according to another embodiment of the present invention.

Turning now to FIG. 3, there is illustrated another embodiment of the present invention in which an additional multiplier is included for calculation of the coefficient and which serves to multiply the balanced push-pull signal with the low-passed filtered high frequency cross-talk signal.

As illustrated, the structure of the embodiment of FIG. 3 is as follows.

The arrangement 122 again forms part of an apparatus for writing to an optical disc comprising a pair of low pass filters 124, 126 for receiving a HF crosstalk signal 128 and the push-pull signal 130 respectively.

The low pass filtered push-pull signal 130 is delivered to a difference unit 132 from which is derived a balanced push pull signal 134.

The balanced push-pull signal 134 is again delivered to a combination of an integrated dump unit 136 and a PI controller 138 although within this particular embodiment, the balanced push-pull signal 134 is delivered by way of a multiplier 152 at which the balanced push-pull signal 134 is multiplied with the low pass filtered HF crosstalk signal 128.

Thus, within an arrangement of FIG. 3, the coefficient (COFF) is calculated on the basis of a multiplication of the balanced push-pull signal and the low pass filtered HF crosstalk signal and the values of the constants then employed within the scaling unit 144 can be confirmed during an optimum power calibration process before recording to a new disc.

In general, the larger of the constant values is selected in order to boost the relatively small balanced push-pull signal arising when the LPP is located adjacent relatively long spaces on the disc.

With regard to the convolution of the push-pull signal with a LPP-like wavelet W, the wavelet comprises the ideal form of the LPP waveform having length "k" is determined on the basis of the sampling rate, and recording speed, of the system.

As with FIG. 2, a bandpass filter 148 is included so as to remove DC components derived from the convolution signal so as to arrive at the final LPP signal 150.

Turning now to FIG. 4, there is provided a representation of the EFM data clock signal, and its relationship with the EFM data signal, the selection of three constant values to be applied at the scaling unit 44, and the resulting RF signals.

The signal-to-noise ratio arising during LPP detection advantageously increases significantly during recording of the disc.

With regard to FIGS. 5A and 5B, there is illustrated a trace arising in accordance with the state of the art in FIG. 5A, and, for comparative purposes, a trace arising in accordance with the present invention in FIG. 5B.

With regard to FIG. 5A, there is illustrated the central trace of the high frequency wobble signal 52a and separate LPP signals 54a, 56a which, as will be appreciated, are not readily discernable from the wobble signal 52a.

However, in accordance with the process and present invention, and as illustrated in FIG. 5B, LPP signals 54b, 56b are readily discernable from a central trace of a wobble signal 52b.

Thus, through use of the present invention, the LPP signal can be made readily available for use during writing to an optical disc such that recording performance when writing to discs such as DVD-R and DVD-RW disc is greatly improved. Advantages such as verified disc address and fine-tuning of the write clock can then be achieved.

While the present invention can be advantageously applicable to recordable optical disc systems such as DVD-R and DVD-RW systems, it can likewise be readily implemented within system ICs and within a general optical disc specification.

Through use of the re-scaling arrangement of the present invention advantageous improvements in recording quality can be achieved.

The invention claimed is:

1. A method of writing data to an optical disc and comprising the steps of:
   obtaining an output signal from optical reading head;
   scaling the said output signal responsive to secondary data derived from the disc by way of the optical reading head, wherein said scaling comprises a multiplication operation;
   deriving a Land Pre Pits (LPP) signal for use during recording to the disc from the said scaled output signal wherein the said scaling is arranged to increase the LPP signal when the LPP is identified as located adjacent a mark on the disc of low light reflectivity;
   wherein the secondary data is derived from the peaks of a high frequency crosstalk signal derived from the disc.

2. A method as claimed in claim 1, wherein the secondary data comprises Eight to Fourteen Modulation (EFM) data.

3. A method as claimed claim 1, wherein the said output signal comprises a push-pull signal.

4. A method as claimed in claim 3, wherein the push-pull signal comprises a balanced push pull signal.

5. A method as claimed in claim 4, wherein the push-pull signal can be determined from the difference between a low pass filtered push-pull signal and a low pass filtered high frequency crosstalk signal.

6. Apparatus for writing data to an optical disc comprising:
   means for obtaining an output signal from an optical reading head;
   means for scaling the said output signal responsive to secondary data obtained from said optical disc and by way of the output head, wherein said scaling means comprises a scaling unit and a multiplier and wherein scaling said output signal comprises multiplying said output signal by an output from the scaling unit;
   means for deriving a Land Pre Pits (LPP) signal for use during recording from the said scaled output signal,
   wherein the said scaling is arranged to increase the LPP signal when the LPP is located as being adjacent a mark on the disc of low light reflectivity;
   wherein the secondary data is derived from the peaks of a high frequency crosstalk signal derived from the disc.

7. Apparatus as claimed in claim 6, wherein the secondary data comprises eight to fourteen modulation data.

8. A method of writing data to an optical disc and comprising the steps of:

obtaining an output signal from optical reading head;

scaling the said output signal responsive to secondary data derived from the disc by way of the optical reading head, wherein said scaling comprises a multiplication operation;

deriving a Land Pre Pits (LPP) signal for use during recording to the disc from the said scaled output signal wherein the said scaling is arranged to increase the LPP signal when the LPP is identified as located adjacent a mark on the disc of low light reflectivity;

wherein the said output signal comprises a balanced push-pull signal, wherein the balanced push-pull signal can be determined from the difference between a low pass filtered push-pull signal and a low pass filtered high frequency crosstalk signal.

* * * * *